UNITED STATES PATENT OFFICE.

PAUL JULIUS AND AKIM TKATSCH, OF LUDWIGSHAFEN, GERMANY, ASSIGNORS TO BADISCHE ANILIN AND SODA FABRIK, OF LUDWIGSHAFEN, GERMANY, A CORPORATION OF BADEN.

DIAZO DYE AND PROCESS OF MAKING SAME.

SPECIFICATION forming part of Letters Patent No. 692,675, dated February 4, 1902.

Application filed November 29, 1901. Serial No. 84,101. (No specimens.)

*To all whom it may concern:*

Be it known that we, PAUL JULIUS, a subject of the Emperor of Austria-Hungary, and AKIM TKATSCH, a subject of the Czar of Russia, doctors of philosophy and chemists, both residents of Ludwigshafen-on-the-Rhine, in the Kingdom of Bavaria, Germany, have invented new and useful Improvements in Coloring-Matter and Methods of Producing the Same, of which the following is a specification.

We have discovered that ortho-diazo-phenol-meta-sulfo-acid, a new compound, combines with various azo dyestuff components to form valuable coloring-matters.

The present invention relates to the combination of ortho-diazo-phenol-meta-sulfo-acid with 1.8-amido-naphthol-4-sulfo-acid.

The body which we term "ortho-diazo-phenol-meta-sulfo-acid" can be obtained by diazotizing ortho-nitranilin-para-sulfo-acid in the usual manner, collecting the difficultly-soluble diazo compound by filtration, and introducing one molecular proportion of the diazo compound thus obtained into an ice-cold solution of one molecular proportion of sodium carbonate and stirring for several hours at zero centigrade. By this treatment the nitrodiazo-benzene sulfo-acid goes into solution and the nitro group thereof is apparently replaced by the hydroxyl group, a new body which we regard as ortho-diazo-phenol-meta-sulfo-acid being formed. The diazo compound may also be poured into the necessary quantity of sodium-acetate solution instead of into soda solution.

The following example will serve to further illustrate the nature of our invention and the manner in which the same may be carried into practical effect; but the invention is not confined to this example. The parts are by weight.

Example: Dissolve one hundred and twenty (120) parts of ortho-nitranilin-para-sulfo-acid sodium salt in seven hundred and fifty (750) parts of water. Add to this solution two hundred and fifty (250) parts of ice and two hundred and nine (209) parts of hydrochloric acid (containing about thirty-two per cent. of HCl) and then a solution of thirty-five (35) parts of sodium nitrate in one hundred (100) parts of water. After stirring for a short time the diazotation is ended. Drain the difficultly-soluble diazo compound, which separates out, on the pump, wash with common-salt solution, and then introduce into an ice-cold solution of fifty-three (53) parts of anhydrous sodium carbonate in one thousand (1,000) parts of water. Stir for some hours at a temperature of zero centigrade until the diazo compound has gone into solution. The process of solution is accompanied by an evolution of gas, and the transformation into the new diazo compound which we regard as ortho-diazo-phenol-meta-sulfo-acid takes place. Pour the diazo solution so obtained into an aqueous solution of one hundred and thirty (130) parts of the sodium salt of 1.8-amido-naphthol-4-sulfo-acid and excess of sodium carbonate in one thousand (1,000) parts of water. Stir until combination is complete, salt out, press, and dry.

Our new coloring-matter dissolves in water, the neutral solution being red-violet. This solution becomes redder on the addition of hydrochloric acid and bluer on the addition of sodium carbonate. It dissolves in concentrated sulfuric acid (containing ninety-six per cent. of $H_2SO_4$) with a violet-red color. It directly dyes wool violet shades, which on treatment on the fiber with potassium bichromate become blackish and on treatment with copper sulfate blue.

Now what we claim is—

The new coloring-matter such as can be obtained by combining ortho-diazo-phenol-meta-sulfo-acid with 1.8-amido-naphthol-4-sulfo-acid, which dissolves in water yielding a red-violet solution which on the addition of hydrochloric acid becomes redder and on the addition of sodium carbonate bluer, which dissolves in concentrated sulfuric acid with a violet-red solution and dyes wool direct violet shades these shades becoming blackish on treatment with potassium bichromate, and blue on treatment with copper sulfate.

In testimony whereof we have hereunto set our hands in the presence of two subscribing witnesses.

PAUL JULIUS.
AKIM TKATSCH.

Witnesses:
BERNHARD C. HESSE,
JACOB ADRIAN.